(12) United States Patent
Katzman

(10) Patent No.: US 12,275,183 B2
(45) Date of Patent: Apr. 15, 2025

(54) THERMOFORMING MACHINE AND METHOD

(71) Applicants: ESSILOR INTERNATIONAL, Charenton-le-Pont (FR); SHAMIR OPTICAL INDUSTRY LTD, Kibbutz Shamir (IL)

(72) Inventor: Youval Katzman, Kibbutz Shamir (IL)

(73) Assignees: Essilor International, Charenton-le-Pont (FR); Shamir Optical Industry Ltd, Kibbutz Shamir (IL)

( * ) Notice: Subject to any disclaimer, the term of this patent is extended or adjusted under 35 U.S.C. 154(b) by 155 days.

(21) Appl. No.: 17/802,818

(22) PCT Filed: Feb. 25, 2021

(86) PCT No.: PCT/EP2021/054653
§ 371 (c)(1),
(2) Date: Aug. 26, 2022

(87) PCT Pub. No.: WO2021/170704
PCT Pub. Date: Sep. 2, 2021

(65) Prior Publication Data
US 2023/0143337 A1 May 11, 2023

(30) Foreign Application Priority Data

Feb. 27, 2020 (EP) ..................................... 20305197

(51) Int. Cl.
*B29C 51/18* (2006.01)
*B29C 51/42* (2006.01)
(Continued)

(52) U.S. Cl.
CPC ............ *B29C 51/18* (2013.01); *B29C 51/422* (2013.01); *B29C 51/424* (2013.01); *B29C 51/46* (2013.01); *B29L 2011/0016* (2013.01)

(58) Field of Classification Search
CPC ....... B29C 51/262; B29C 51/30; B29C 51/40; B29C 51/365
See application file for complete search history.

(56) References Cited

U.S. PATENT DOCUMENTS 3,159,695 A 12/1964 Behringer
3,657,044 A 4/1972 Singer
(Continued)

FOREIGN PATENT DOCUMENTS

CN 105307830 A 2/2016
CN 106541563 A 3/2017
(Continued)

OTHER PUBLICATIONS

International Search Report for PCT/EP2021/054653, mailed Apr. 13, 2021, 4 pages.
(Continued)

*Primary Examiner* — Matthew J Daniels
(74) *Attorney, Agent, or Firm* — NIXON & VANDERHYE

(57) ABSTRACT

This thermoforming machine includes a thermoforming chamber having at least one heated air inlet through which heated air flows into the thermoforming chamber at a controlled pressure. The air inlet cooperates with a heated air flow distribution regulator located in the thermoforming chamber and through which the heated air flows out of the thermoforming chamber at a predetermined temperature. The regulator includes a heated air flow regulating mask receiving heated air flow, having a plurality of flow restricting elements providing different air flow restrictions.

19 Claims, 3 Drawing Sheets

(51) Int. Cl.
  *B29C 51/46* (2006.01)
  *B29L 11/00* (2006.01)

(56) References Cited

U.S. PATENT DOCUMENTS

| | | | |
|---|---|---|---|
| 3,687,594 A | | 8/1972 | Medendorp |
| 4,786,351 A | | 11/1988 | Elliott et al. |
| 7,459,120 B2 | * | 12/2008 | Herod ............... B29C 51/10 |
| | | | 264/2.7 |
| D762,814 S | * | 8/2016 | Sawchuk ............... D23/249 |
| 2014/0377523 A1 | | 12/2014 | Waggoner |
| 2019/0061226 A1 | | 2/2019 | Kamio |
| 2020/0039157 A1 | | 2/2020 | Yoshimura |
| 2022/0009135 A1 | * | 1/2022 | Taguchi ............... B29C 33/18 |
| 2022/0288839 A1 | * | 9/2022 | Iwanishi ............... B29C 51/10 |

FOREIGN PATENT DOCUMENTS

| | | |
|---|---|---|
| CN | 108698308 A | 10/2018 |
| CN | 110291427 A | 9/2019 |
| DE | 2 019 295 | 11/1971 |
| GB | 1 338 324 | 11/1973 |
| GB | 1 396 573 | 6/1975 |

OTHER PUBLICATIONS

Written Opinion of the ISA for PCT/EP2021/054653, mailed Apr. 13, 2021, 8 pages.
Extended Search Report for EP20305197.4, dated Aug. 7, 2020, 9 pages.
Office Action and Search Report, issued in Chinese Patent Application No. 202180011456.6 dated Feb. 29, 2024.

* cited by examiner

THERMOFORMING MACHINE AND METHOD

This application is the U.S. national phase of International Application No. PCT/EP2021/054653 filed Feb. 25, 2021, which designated the U.S. and claims priority to EP Patent Application No. 20305197.4 filed Feb. 27, 2020, the entire contents of each of which are hereby incorporated by reference.

FIELD OF THE DISCLOSURE

The present disclosure relates to a thermoforming machine and method. Such thermoforming may for example be used in the process of laminating a functional multi-layer film on an optical article such as an ophthalmic lens by use of increased pressure and temperature.

BACKGROUND OF THE DISCLOSURE

By "functional film", what is meant is a film providing the optical article with at least one feature among a hard coat, anti-scratch properties, an antireflective coating, a polarizing film, a tint, a mirror or a filter for specific wavelengths, anti-shock, anti-smudge, anti-fog, self-healing, self-cleaning or antistatic properties, etc.

By "laminating" a film on an optical article, what is meant is the operation involving the deposition of a film on a surface of the optical article to be laminated. The lamination operation is usually performed by first providing the film disposed onto a carrier. The film and the carrier are then compressed onto the surface to be laminated, by applying a difference of pressure between a side of the carrier having both the film and the optical article and the other side, or by applying a force from the optical article side.

An adhesive, e.g. a pressure sensitive adhesive, is generally previously disposed on the face of the film which is intended to be pressed onto said surface so as to maintain the film on said surface.

In alternative processes, the adhesive is positioned onto the optical article prior to pressing the film onto the optical article and/or the film is pressed onto the optical article without being fixed to a carrier, but for example by directly applying pressure on the film or using a stamp or a blown membrane or balloon.

In the field of optical article manufacturing, the film lamination process generally requires pre-processing or "forming" the consumable or laminate complex, in order to shape the film with a given curvature, so as to comply with and match the curvature of the surfaced prescription ophthalmic lens to laminate better than a flat film, be it the convex or concave side of the lens.

To laminate a lens, in order to induce a desired curvature with a custom radius into a film complex or consumable 10 as shown in FIG. 1, the consumable 10 comprising a carrier 12 and a film patch 14 glued to the carrier 12, the consumable 10 is usually clamped and inflated by thermoforming. FIG. 2 shows from top to bottom three successive phases of the thermoforming of the consumable 10 of FIG. 1.

When thermoforming, uniform heat distribution is desired within the member being thermoformed i.e. within the patch 14 in FIG. 2.

In addition, it is desirable to maintain a controlled pressure within the thermoforming chamber.

When introducing heated air into the thermoforming chamber, the heated air flow is directional and is directed towards the patch in order to heat it by convection. The temperature of the air must be maintained in a predetermined range, e.g. between 100 and 115 degrees Celsius, depending on the desired sag or curvature for the film to laminate.

If the air simply flows towards the center of the patch and heats it from the center outwards, this will result in a large temperature gradient within the film, the area of the film below the air flow being hotter than the other areas. This is unsuitable for thermoforming.

SUMMARY OF THE DISCLOSURE

An object of the disclosure is to overcome the above-mentioned drawbacks of the prior art.

To that end, the disclosure provides a thermoforming machine comprising a thermoforming chamber having at least one heated air inlet through which heated air flows into the thermoforming chamber at a controlled pressure, wherein the air inlet cooperates with a heated air flow distribution regulator located in the thermoforming chamber and through which the heated air flows out of the thermoforming chamber at a predetermined temperature, the regulator comprising a heated air flow regulating mask receiving heated air flow, having a plurality of flow restricting elements providing different air flow restrictions.

This makes it possible to reduce the temperature gradients in the member being thermoformed during thermoforming, resulting in significantly improved precision in the curvature of that member.

The disclosure also provides a thermoforming method using a thermoforming machine as succinctly described above, for giving a predetermined curvature to a film to be applied on an optical article, the film being placed below the mask so as to be centered with respect to the mask, wherein heated air flows from the heated air inlet into the thermoforming chamber at a controlled pressure and flows out of the thermoforming chamber at a predetermined temperature by passing through the heated air flow regulating mask, thus generating uniform heat distribution within the film, until the predetermined target curvature is obtained.

The disclosure further provides an optical article comprising a front face and a rear face, wherein at least one of the front and rear faces is coated by a film thermoformed by implementing a thermoforming method as succinctly described above.

The disclosure further provides an assembly comprising a thermoforming machine and a film and/or film patch and/or active film and/or adhesive to be thermoformed by the thermoforming machine, the thermoforming machine comprising a thermoforming chamber having at least one heated air inlet through which heated air flows into the thermoforming chamber at a controlled pressure, wherein the air inlet cooperates with a heated air flow distribution regulator located in the thermoforming chamber and through which the heated air flows out of the thermoforming chamber at a predetermined temperature, the regulator comprising a heated air flow regulating mask receiving heated air flow, having a plurality of flow restricting elements providing different air flow restrictions, in an embodiment for the assembly, the film and/or film patch and/or active film and/or adhesive has a non-circular predetermined shape and the plurality of flow restricting elements have a same or similar geometry as the predetermined shape of the film and/or film patch and/or active film and/or adhesive, alternatively the film and/or film patch and/or active film and/or adhesive has a predetermined shape and the plurality of flow restricting elements is distributed both in the center of the heated air flow regulating mask and on a predetermined number of concentric shapes, the concentric shapes having a same geometry as the predetermined shape of the film and/or film patch and/or active film and/or adhesive.

In the context above, the non-circular predetermined shape of the film and/or film patch and/or active film and/or adhesive corresponds to the smallest feature between the film, a contour of the thermoforming chamber which imposes the shape of the thermoforming, and a possible patch present within the film; said patch being destined to be thereafter transferred on an ophthalmic lens.

In the context above, a non-circular shape means that more than 3% or preferably more than 5% of the effective surface of the film and/or film patch and/or active film and/or adhesive is present out of the biggest inscribed circle that could be inscribed within the shape of the patch. The effective surface of the film patch in this context corresponds to the surface of the film patch excluding one or more possible handling flaps or strips.

As the method, the optical article and the assembly according to the disclosure have the same advantages as the thermoforming machine, they are not repeated here.

BRIEF DESCRIPTION OF THE DRAWINGS

For a more complete understanding of the description provided herein and the advantages thereof, reference is now made to the brief descriptions below, taken in connection with the accompanying drawings and detailed description, wherein like reference numerals represent like parts.

DETAILED DESCRIPTION OF THE DISCLOSURE

In the description which follows, although making and using various embodiments are discussed in detail below, it should be appreciated that as described herein are provided many inventive concepts that may embodied in a wide variety of contexts. Embodiments discussed herein are merely representative and do not limit the scope of the disclosure. It will also be obvious to one skilled in the art that all the technical features that are defined relative to a process can be transposed, individually or in combination, to a device and conversely, all the technical features relative to a device can be transposed, individually or in combination, to a process and the technical features of the different embodiments may be exchanged or combined with the features of other embodiments.

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises", "has", "contains", or "includes" one or more steps or elements possesses those one or more steps or elements, but is not limited to possessing only those one or more steps or elements.

Figure 1:
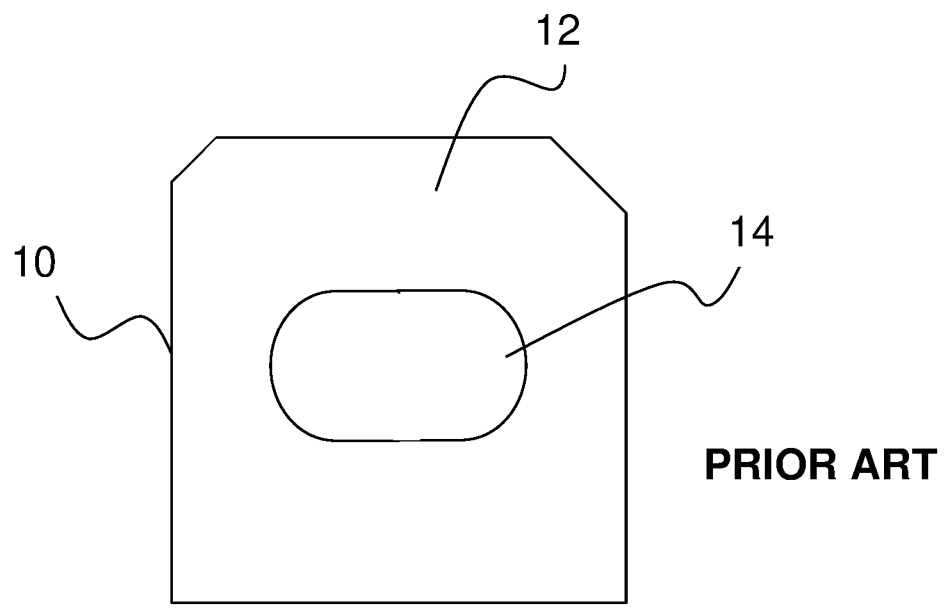
FIG. 1 is a schematic view of a prior art consumable to be thermoformed.
Figure 2:
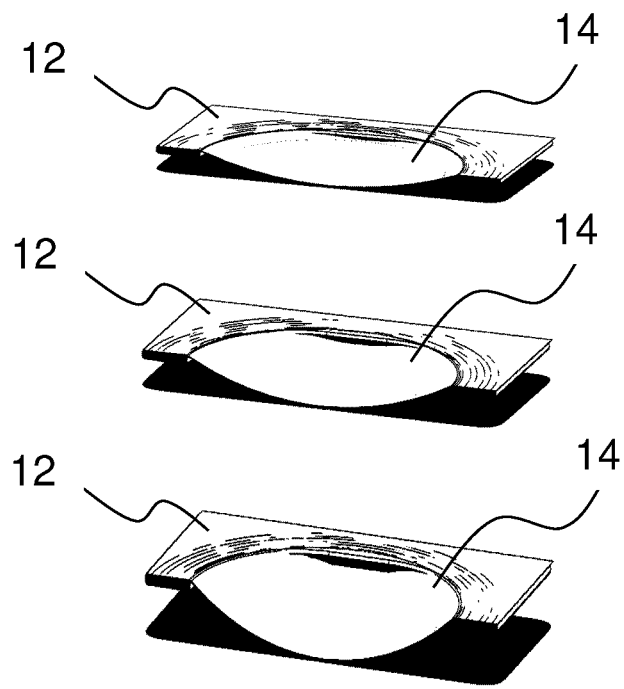
FIG. 2 is a set of three schematic views showing successive phases of the prior art thermoforming of the consumable of FIG. 1.
Figure 3:
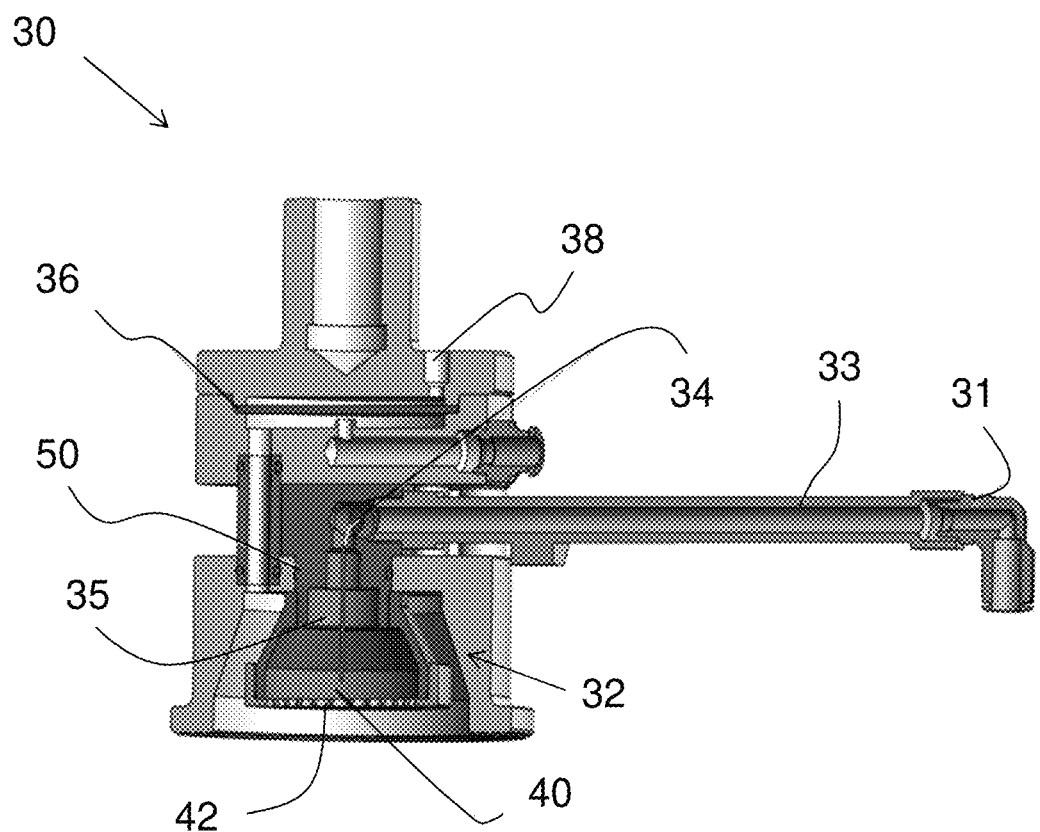
FIG. 3 is a schematic view of a thermoforming machine according to the disclosure, in a particular embodiment.

As shown in FIG. 3, a thermoforming machine 30 according to the disclosure comprises a thermoforming chamber 32.

The thermoforming chamber 32 has at least one heated air inlet 34 through which heated air flows, from an air inlet 31 at room temperature through an inline heating pipe 33, into the thermoforming chamber 32 at a controlled pressure. To that end, the thermoforming chamber 32 may comprise a back pressure regulating diaphragm 36 and a pressurized air inlet 38 for back pressure regulation. The thermoforming chamber 32 may further comprise a thermocouple 35 for controlling the temperature. It further enables to control processes for reaching or maintaining a predetermined temperature.

The heated air inlet 34 cooperates with a heated air flow distribution regulator 40 located in the thermoforming chamber 32. The heated air flows through the air flow distribution regulator 40 out of the thermoforming chamber 32 at a predetermined temperature. The heated air flow distribution regulator 40 enables to control a distribution of the air flow within the thermoforming chamber 32. As the air flow is heated air, it thus enables to control the temperature distribution within the chamber. Indeed, the air flow being heated prior to entering the thermoforming chamber 32, the air flow temperature is controlled and predetermined easily. Further, controlling the temperature within the thermoforming chamber 32 becomes linked with controlling a heated air flow rate within the thermoforming chamber 32.

According to an embodiment of the disclosure, the heated air flow distribution regulator 40 is oriented toward an opening in the thermoforming chamber 32 which is destined to be closed by the film to be thermoformed.

In a further embodiment, the heated air flow distribution regulator 40 is positioned relatively parallel to the above-mentioned opening, or so that the film prior to thermoforming is essentially parallel to the heated air flow distribution regulator 40 if the film to be thermoformed is essentially flat prior to thermoforming.

Figure 4:
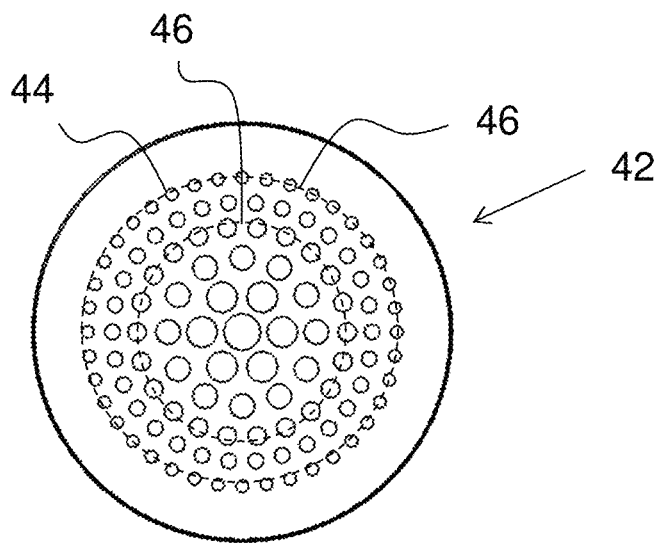
FIG. 4 is a schematic view of an air flow regulating mask comprised in a thermoforming machine according to the disclosure in a particular embodiment.

According to the disclosure, the regulator 40 comprises a heated air flow regulating mask 42 receiving heated air flow and having a plurality of flow restricting elements 44 shown in FIG. 4, providing different air flow restrictions.

In an embodiment, the plurality of flow restricting elements 44 are distributed in such a manner from the periphery to the center of the mask 42 that a first one of the flow restricting elements 44 restricts the air flow less than a second one of the flow restricting elements 44.

This results in reduced direct air flow in the periphery of the patch, which balances the effect of the indirect air flow heating, caused by heated air flowing from the center of the patch to its periphery. Thus, uneven heating is avoided.

For example, the size of the above-mentioned first one of the flow restricting elements 44 may be larger than the size of the above-mentioned second one of the flow restricting elements 44.

In an embodiment, the first flow restricting element 44 is closer to the center of the mask than the second flow restricting element 44.

In another embodiment, conversely, the second flow restricting element 44 is closer to the center of the mask than the first flow restricting element 44.

In the particular embodiment shown in FIG. 4, the plurality of flow restricting elements 44 is distributed on a predetermined number of concentric circles 46, the center of which is the center of the mask 42. In addition, at least one flow restricting element 44 may be provided in the center of the mask 42.

Figure 6:
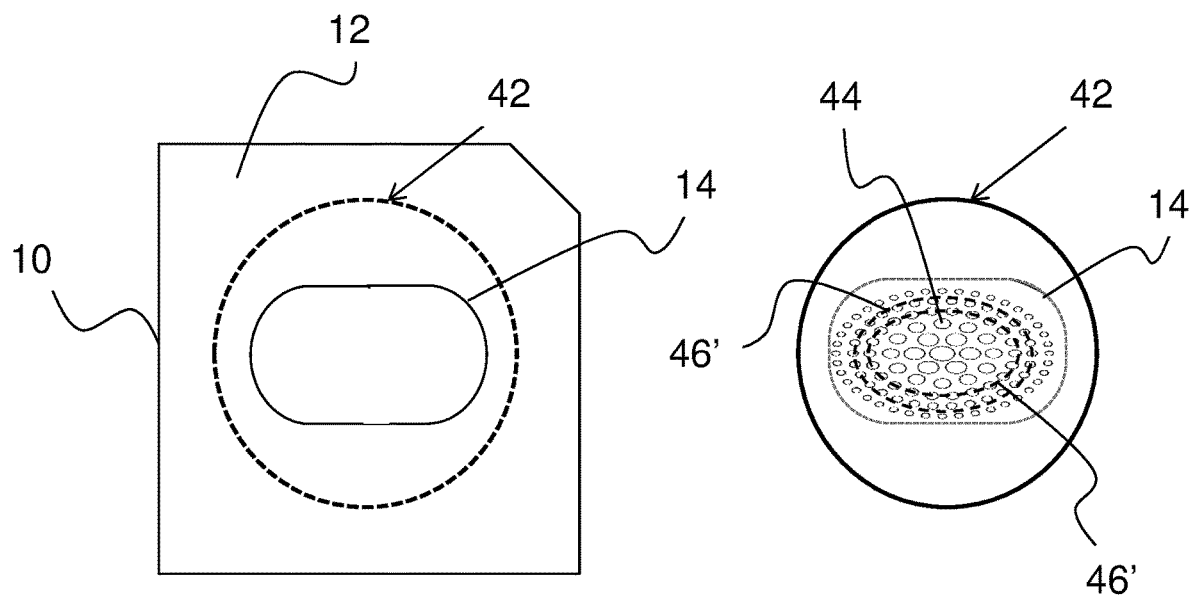
FIG. 6 is a schematic view of an air flow regulating mask comprised in a thermoforming machine according to the disclosure in a particular embodiment and of a corresponding film patch comprised in an assembly according to the disclosure in a particular embodiment.

The circle is a non-limiting example of geometry which may be replaced by another shape. In another embodiment, the plurality of flow restricting elements 44 is distributed on a predetermined number of concentric contours, which may be related to the shape of the patch 14, such as an ellipse-like shape, as illustrated in FIG. 6.

In the particular embodiment shown in FIG. 4, the flow restricting elements 44 located on a same shape of the concentric shapes, i.e. on a given one and the same circle of the concentric circles 46 in that non-limiting example, have the same size. Moreover, the flow restricting elements 44 located on a same shape of the concentric shapes, i.e. on a given one and the same circle of the concentric circles 46 in that non-limiting example, may be equidistant from each other.

By way of non-limiting example, the number of concentric shapes may be 5 and the value of the angular sector between two adjacent flow restricting elements 44 on a same shape may be between 9° and 60°, in particular about 9° for the outermost concentric shape and about 60° for the centermost concentric shape.

In an embodiment, at least two concentric shapes are such that the above-mentioned angular sector is greater for the concentric shape closer to the center of the mask 42.

In the particular embodiment shown in FIG. 4, the flow restricting elements 44 are circular openings. By way of non-limiting example, the diameters of the openings may be between 1 mm and 10 mm, in particular about 1 mm for the openings of the outermost concentric shapes and about 10 mm for an opening at the center of the concentric shapes.

However, the flow restricting elements 44 may have any other geometry such as square, rectangular, triangular, elliptic, a contour similar to the patch shape, etc. and may have any appropriate dimensions.

In an embodiment, the heated air flow distribution regulator 40 may have a flat surface.

In an embodiment, the heated air flow distribution regulator 40 may have a curved surface.

Figure 5:
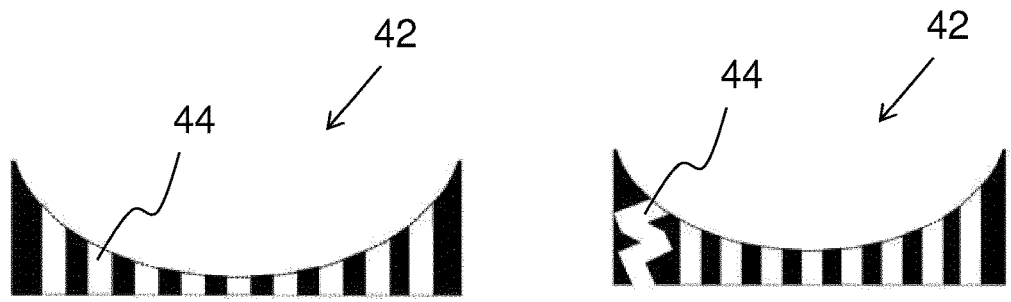
FIG. 5 is a set of two schematic cross-section views of an air flow regulating mask comprised in a thermoforming machine according to the disclosure in a particular embodiment.

Moreover, the flow restricting element 44 may have a variable volume. In other words, the volume of a given element 44, e.g. the volume of the opening in a given element 44, may be different from the volume of the opening in another element 44 in the same regulator 40. Besides, the air flow can be controlled by the size of the cross-section area of the flow restricting elements 44, because a small cross-section area may cause significant friction, but the air flow can also be controlled by the depth or height of the flow restricting elements 44 and/or by the form of the air path through the flow restricting elements 44. FIG. 5 shows two non-limiting examples of the mask 42 in cross-section. In the example on the right of FIG. 5, one of the elements 44 has a path with air flow changing directions and the flow restricting elements 44 have a variable volume.

A thermoforming method using a thermoforming machine as described above makes it possible to give a predetermined curvature to a film to be applied on an optical article.

The film is placed below the mask 42 so as to be centered with respect to the mask 42. Fixing the film below the mask 42 enables sealing of the thermoforming chamber 32.

Then, heated air flows from the heated air inlet 34 into the thermoforming chamber 32 at a controlled pressure into an initial pressure zone 50 of the thermoforming chamber 32 (see zone 50 in FIG. 3) and, at a predetermined low threshold pressure, begins to flow out of the thermoforming chamber 32 through the heated air flow distribution regulator 40, at a predetermined temperature, by passing through the mask 42, thus generating uniform heat distribution within the film, until the predetermined target temperature is reached, the target temperature depending on the material and/or on the desired final curvature or sag of the film.

Once the target temperature is obtained, the back pressure regulating diaphragm 36 used to control the pressure increases the pressure, for example by 0.03 bar/s, up to for example 5 bar, either in the upper, heating chamber, or in a lower chamber, if any.

The pressure increases until the target thermoforming curvature is obtained or until the maximum allowed pressure (predetermined high threshold pressure) is reached.

The back pressure mechanism maintains the pressure within the thermoforming chamber 32 by introducing pressurized air above the back pressure regulating diaphragm 36, through the pressurized air inlet 38. If the pressure inside the thermoforming chamber 32 surpasses the back-pressure on the diaphragm 36, the diaphragm 36 opens and releases air from within the thermoforming chamber 32, thus reducing the pressure. This enables control of the pressure within the thermoforming chamber 32 throughout the process, while maintaining constant flow of heated air from the heated air inlet 34, at a controlled temperature.

By way of non-limiting example, the temperature may be comprised between 100° C. and 140° C. and is preferably 120° C.

By way of non-limiting example, the pressure may be comprised between 0.2 bar and 8 bar, preferably between 0.5 bar and 6 bar.

Depending on the dimensions of the thermoforming chamber 32, the heated air may have a flow rate comprised between 20 l/min and 160 l/min and is preferably 60 l/min.

Alternatively, the pressure in the thermoforming chamber 32 may be maintained at atmospheric pressure. In such a case, increased pressure for forming may be applied on the film from the opposite side, where the film patch faces downwards, the pressure from below introducing a convex shape suited for front-side lamination.

At least one of the front and rear faces of an optical article such as an ophthalmic lens may be coated by a film thermoformed in the various manners described above.

In an embodiment of an assembly according to the present disclosure, comprising a thermoforming machine as described above and a film and/or a film patch and/or an active (functional) film and/or an adhesive to be thermoformed by the thermoforming machine, where the film and/or the film patch and/or the active film and/or the adhesive has a predetermined shape, the flow restricting elements 44 comprised in the heated air flow regulating mask 42 may have a geometry identical to, or similar to, or at least reminiscent of the geometry of the shape of the film and/or of the film patch and/or of the active film and/or of the adhesive.

FIG. 6 illustrates a non-limiting example of such flow restricting elements 44 (shown on the right of the drawing).

As shown in FIG. 6, the contour of the set of flow restricting elements 44 has a geometry that approximately matches the geometry of the shape of the film patch 14.

In that particular example, the concentric shapes are not circular, but elliptic, as shown by the concentric ellipses 46'. Two of the concentric ellipses 46' are shown in dashed lines, the dashed lines having been added on the drawing for better showing the concentric ellipses 46'.

In that particular embodiment, the concentric shapes are the concentric ellipses 46' and approximately match the film patch 14 (shown on the left of the drawing).

In addition, as also shown in the non-limiting example of FIG. 6, each of the flow restricting elements 44 is itself an ellipse.

However, the features relating to the elliptic or circular or other geometry of the flow restricting elements 44 themselves and/or the concentric circles 46 resp. ellipses 46' and/or the similarity between the shape of the film patch 14 and the contour of the set of flow restricting elements 44 may be present, either in separate embodiments, or in combination with one another in one or several embodiment(s).

In an embodiment, the thermoforming method described above may use an assembly as described above, for giving a predetermined curvature to a film to be applied on an optical article, the film being placed below the mask so as to be centered with respect to the mask. Heated air may flow from the heated air inlet into the thermoforming chamber at a controlled pressure and flow out of the thermoforming chamber at a predetermined temperature by passing through the heated air flow regulating mask, thus generating uniform heat distribution within the film, until the predetermined target curvature is obtained.

Although representative systems and methods have been described in detail herein, those skilled in the art will recognize that various substitutions and modifications may be made without departing from the scope of what is described and defined by the appended claims.

The invention claimed is:

1. A thermoforming machine adapted for use in a process of laminating a functional multi-layer film on an optical article by use of increased pressure and temperature, the thermoforming machine comprising:
    a thermoforming chamber having at least one heated air inlet through which heated air flows into said thermoforming chamber at a controlled pressure; and
    a heated air flow distribution regulator extending downward into said thermoforming chamber and holding a heated air flow regulating mask at a bottom thereof, the heated air flow regulating mask receiving heated air flow and having a plurality of flow restricting elements providing different air flow restrictions to control a distribution of the heated air flow within the thermoforming chamber, said heated air inlet cooperating with the heated air flow distribution regulator such that said heated air flows out of said thermoforming chamber at a predetermined temperature.

2. The thermoforming machine according to claim 1, wherein said plurality of flow restricting elements is distributed in a predetermined manner from the periphery to the center of said mask, a first one of said flow restricting elements restricting the air flow less than a second one of said flow restricting elements.

3. The thermoforming machine according to claim 2, wherein said first one of said flow restricting elements is closer to the center of said mask than said second one of said flow restricting elements.

4. The thermoforming machine according to claim 3, wherein said plurality of flow restricting elements is distributed both in the center of said mask and on a predetermined number of concentric shapes, the center of said concentric shapes being the center of said mask.

5. The thermoforming machine according to claim 2, wherein said second one of said flow restricting elements is closer to the center of said mask than said first one of said flow restricting elements.

6. The thermoforming machine according to claim 5, wherein said plurality of flow restricting elements is distributed both in the center of said mask and on a predetermined number of concentric shapes, the center of said concentric shapes being the center of said mask.

7. The thermoforming machine according to claim 2, wherein said plurality of flow restricting elements is distributed both in the center of said mask and on a predetermined number of concentric shapes, the center of said concentric shapes being the center of said mask.

8. The thermoforming machine according to claim 7, wherein the flow restricting elements located on a specific one of said concentric shapes have the same size.

9. The thermoforming machine according to claim 7, wherein the flow restricting elements located on a specific one of said concentric shapes are equidistant from each other.

10. The thermoforming machine according to claim 9, wherein said number of concentric shapes is 5 and the value of the angular sector between two adjacent flow restricting elements on a same shape is between 9° and 60°.

11. The thermoforming machine of claim 7, wherein the concentric shapes are circles.

12. The thermoforming machine according to claim 1, wherein said flow restricting elements are circular openings.

13. The thermoforming machine according to claim 12, wherein the diameters of said openings are between 1 mm and 10 mm.

14. A thermoforming machine comprising:
    a thermoforming chamber having at least one heated air inlet through which heated air flows into said thermoforming chamber at a controlled pressure; and
    a heated air flow distribution regulator disposed in said thermoforming chamber and cooperating with the air inlet of the thermoforming chamber such that said heated air flows out of said thermoforming chamber through the air inlet at a predetermined temperature, said heated air flow distribution regulator comprising a heated air flow regulating mask receiving the heated air flow, the heated air flow regulating mask having a plurality of flow restricting elements providing different air flow restrictions,
    wherein said heated air flow distribution regulator has a curved surface.

15. A thermoforming method using the thermoforming machine according to claim 1, to give a predetermined curvature to a film to be applied on an optical article, the method comprising:
    placing said film below said mask to be centered with respect to said mask,
    wherein heated air flows from said heated air inlet into said thermoforming chamber at a controlled pressure and flows out of said thermoforming chamber at a predetermined temperature by passing through said heated air flow regulating mask, thus generating uniform heat distribution within said film, until said predetermined target curvature is obtained.

16. The thermoforming method according to claim 15, wherein said temperature is between 100° C. and 140° C.

17. The thermoforming method according to claim 15, wherein said pressure is between 0.2 bar and 8 bar.

18. An assembly comprising:
   a thermoforming machine comprising
      a thermoforming chamber having at least one heated air inlet through which heated air flows into said thermoforming chamber at a controlled pressure, and
      a heated air flow distribution regulator extending downward into said thermoforming chamber and holding a heated air flow regulating mask at a bottom thereof, the heated air flow regulating mask receiving heated air flow and having a plurality of flow restricting elements providing different air flow restrictions to control a distribution of the heated air flow within the thermoforming chamber; and
   one or more of a film, a film patch, an active film, and an adhesive to be thermoformed by said thermoforming machine and positioned below the heated air flow regulating mask in relation to the thermoforming chamber, the second surface of the heated air flow regulating mask being configured to face the one or more of the film, the film patch, the active film, and the adhesive, the heated air flow flowing through the heated air flow regulating mask to the one or more of the film, the film patch, the active film, and the adhesive to generate uniform heat distribution within the one or more of the film, the film patch, the active film, and the adhesive.

19. The assembly of claim 18, wherein the one or more of said film, the film patch, the active film, and the adhesive has a non-circular predetermined shape and said plurality of flow restricting elements have a same geometry as said predetermined shape of the one or more of said film, the film patch, the active film, and the adhesive.

* * * * *